(12) United States Patent
Abdelsamie et al.

(10) Patent No.: US 9,131,327 B2
(45) Date of Patent: Sep. 8, 2015

(54) METHODS AND APPARATUS TO CONTROL ACCESSORIES

(71) Applicant: Research In Motion Limited, Waterloo (CA)

(72) Inventors: Ahmed Abdelsamie, Nepean (CA); Marc Élis Meunier, Kitchener (CA); Antoine Gilles Joseph Boucher, Kitchener (CA); Danqing Jiang, Kitchener (CA); Jeff Chi Shing Chan, Markham (CA)

(73) Assignee: BlackBerry Limited, Waterloo, Ontario (CA)

( * ) Notice: Subject to any disclaimer, the term of this patent is extended or adjusted under 35 U.S.C. 154(b) by 274 days.

(21) Appl. No.: 13/649,787

(22) Filed: Oct. 11, 2012

(65) Prior Publication Data

US 2013/0095757 A1 Apr. 18, 2013

Related U.S. Application Data

(60) Provisional application No. 61/546,440, filed on Oct. 12, 2011.

(51) Int. Cl.
*H04B 5/00* (2006.01)
*H04W 4/00* (2009.01)

(52) U.S. Cl.
CPC .............. *H04W 4/001* (2013.01); *H04W 4/008* (2013.01)

(58) Field of Classification Search
CPC ............... H04N 1/00307; H04N 2201/0044; H04N 2201/006; G06F 3/1253; H04M 1/7253; H04M 2250/02; H04W 8/005; H04W 12/06; H04W 4/02; H04W 76/02; H04W 84/18; H04W 28/18; H04W 4/00; H04W 88/02; H04W 92/18; H04W 28/06; H04W 48/14
USPC ................................. 455/41.1–41.3; 358/1.15
See application file for complete search history.

(56) References Cited

U.S. PATENT DOCUMENTS

| | | | |
|---|---|---|---|
| 8,159,706 B2 * | 4/2012 | Kato | ............................ 358/1.15 |
| 2006/0008256 A1 | 1/2006 | Khedouri et al. | |

(Continued)

FOREIGN PATENT DOCUMENTS

| | | | | |
|---|---|---|---|---|
| EP | 2018000 | | 1/2009 | |
| EP | 2018000 A1 * | | 1/2009 | .............. H04L 12/28 |

(Continued)

OTHER PUBLICATIONS

Verdult et al., Practical attacks on NFC enabled cell phones, Feb. 22, 2011 Third International Workshop on Near Field Communication.*

(Continued)

*Primary Examiner* — Edward Urban
*Assistant Examiner* — Max Mathew
(74) *Attorney, Agent, or Firm* — Fish & Richardson P.C.

(57) ABSTRACT

Methods and apparatus to control accessories are disclosed. An example method includes establishing a first close-proximity communication connection via a first protocol by providing connection information via a second close-proximity communication connection via a second protocol, obtaining configuration information via the second close-proximity communication connection, and configuring a response to an event associated with the second close-proximity communication connection.

19 Claims, 11 Drawing Sheets

(56) References Cited

U.S. PATENT DOCUMENTS

| 2007/0080823 | A1* | 4/2007 | Fu et al. ................ 340/825.22 |
| 2008/0143487 | A1 | 6/2008 | Hulvey |
| 2009/0066998 | A1* | 3/2009 | Kato ............................. 358/1.15 |
| 2009/0325484 | A1 | 12/2009 | Lele et al. |
| 2010/0045441 | A1 | 2/2010 | Hirsch et al. |
| 2010/0082821 | A1 | 4/2010 | Rosenblatt et al. |
| 2010/0130125 | A1 | 5/2010 | Nurmi |
| 2010/0167643 | A1 | 7/2010 | Hirsch |
| 2010/0267376 | A1 | 10/2010 | Saari et al. |
| 2011/0205944 | A1 | 8/2011 | Miyabayashi et al. |
| 2012/0099566 | A1 | 4/2012 | Laine et al. |
| 2012/0139847 | A1* | 6/2012 | Hunt ............................. 345/173 |
| 2012/0220222 | A1 | 8/2012 | Hill |

FOREIGN PATENT DOCUMENTS

| EP | 2582160 | 4/2013 |
| WO | 2013053063 | 4/2013 |

OTHER PUBLICATIONS

Krishnamurthy et al., "Context-Based Adaptation of Mobile Phones Using Near-Field Communication", Jul. 2006, Third Annual International Conference on Mobile and Ubiquitous System; Networking & Services.*

Sanchez et al., "Controlling Multimedia Players Using NFC Enabled Mobile Phones", 2007, Proceeding of the 6th international Conference on Mobile and ubiquitous multimedia.*

Steffen et al., "Near Filed Communication (NFC) in an Automotive Environment", (6 pages).

Wang, Pinglei, "Concepts for an Intuitive User Interface for DLNA Using NFC Technology", Master Thesis, Universitat Stuttgart, Jul. 4, 2011, (149 pages).

"Nokia Essence Bluetooth Stereo Headset", nfc, May 1, 2012, (1 page).

Texas Instruments, Multi-Protocol Fully Integrated 13.56-MHz RFID/Near Field Communication (NFC) Transceiver IC, Aug. 2011,(85 pages).

European Patent Office, "Extended European Search Report", issued in connection with European patent application No. 12188437.3, dated Jan. 28, 2013, (6 pages).

Ramon Hervas et al., "Context Cookies", In proceeding of: Knowledge-Based Intelligent and Engineering Systems, 12th International Conference, dated Sep. 3-5, 2008 (9 pages).

International Bureau, "International Preliminary Report on Patentability," issued in connection with Application No. PCT/CA2012/050719, Apr. 15, 2014, 9 pages.

International Searching Authority, "International Search Report", issued in connection with PCT application No. PCT/CA2012/050719, mailed Jan. 18, 2013, (6 pages).

International Searching Authority, "Written Opinion of the International Searching Authority", issued in connection with PCT application No. PCT/CA2012/050719, mailed Jan. 18, 2013, (8 pages).

Verdult et al., "Practical Attacks on NFC Enabled Cell Phones", 2011 3rd International Workshop on Near Field Communication (NFC), Feb. 2011, (6 pages).

Krishnamurthy et al., "Context-Based Adaptation of Mobile Phones Using Near-Field Communication", 2006 Third Annual International Conference on Mobile and Ubiquitous Systems: Networking & Services, Jul. 2006, (10 pages).

Karthikeyan et al., "RFID Security without Extensive Cryptography", Proceedings of the 3rd ACM workshop on Security of ad hoc and sensor networks, Nov. 7, 2005, (5 pages).

Sanchez et al.. "Controlling Multimedia Players Using NFC Enabled Mobile Phones", Proceeding of the 6th international conference on Mobile and ubiquitous multimedia, 2007, (8 pages).

* cited by examiner

METHODS AND APPARATUS TO CONTROL ACCESSORIES

RELATED APPLICATIONS

This patent claims priority to U.S. Provisional Application Ser. No. 61/546,440, filed Oct. 12, 2011, the entirety of which is hereby incorporated by reference.

FIELD OF THE DISCLOSURE

This disclosure relates generally to mobile communications and, more particularly, to methods and apparatus to control accessories.

BACKGROUND

A mobile device may be provided with an accessory device to enhance the functionality of the mobile device. An example accessory is a Bluetooth headset, which enables a user to conduct a conversation using the mobile device without having to hold the mobile device to his head. Some accessories are configurable to adapt to the preferences of different users.

DETAILED DESCRIPTION

Figure 1:
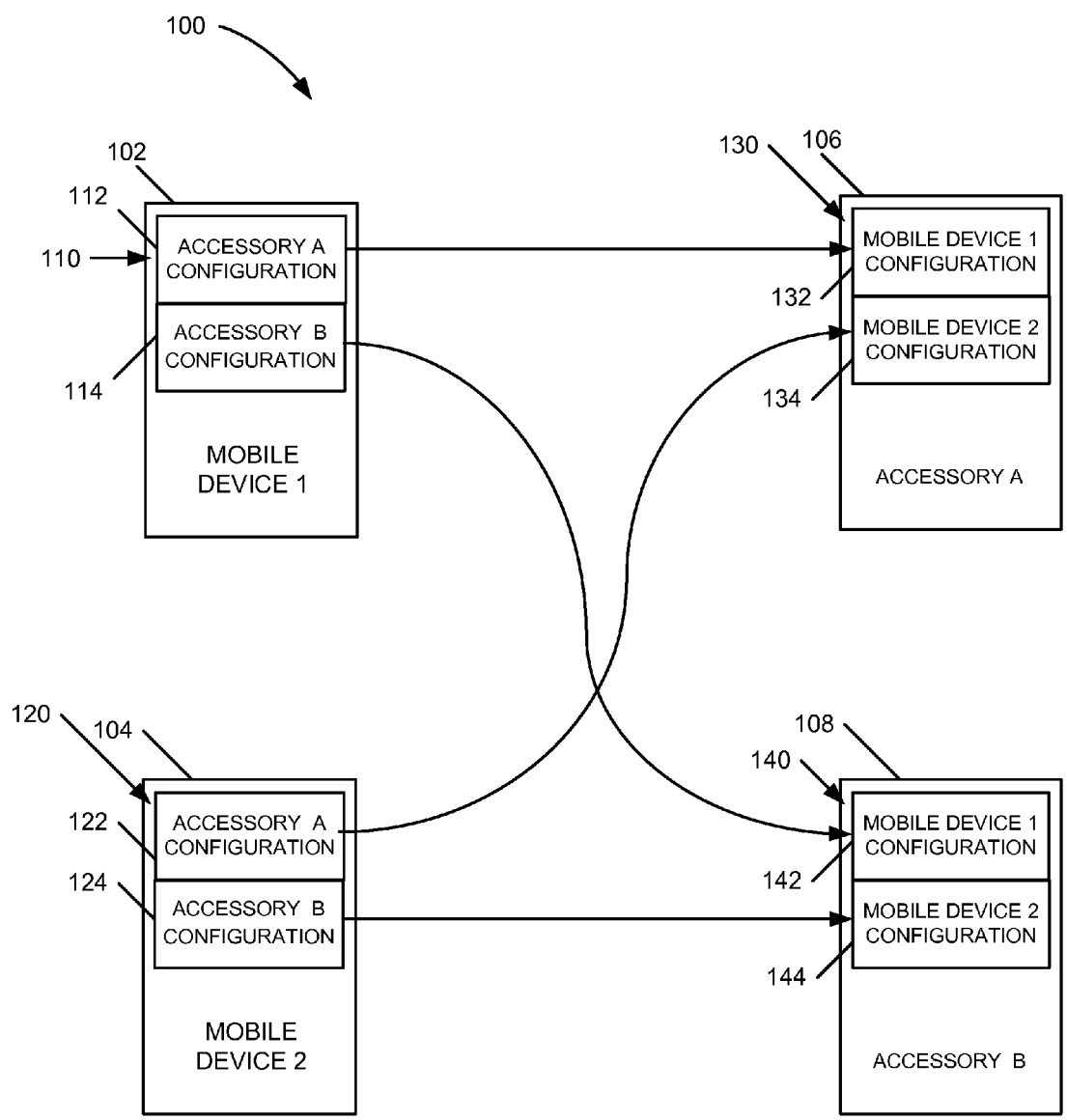
FIG. 1 is a block diagram of an example communication system in which mobile devices can transfer configuration information to accessories.

As shown in FIG. 1, a communication system 100 is adapted to transfer configuration information, parameters, or files between mobile devices and accessories, which may include, but are not limited to, Bluetooth headsets, Bluetooth speakerphones, Bluetooth audio devices, tablet computers, radios, media players, e-book readers, Internet browsing devices, etc., or any other devices that may be associated with mobile devices. The communication system 100 may include a first mobile device 102 and a second mobile device 104, and also includes a first accessory 106 (Accessory A) and a second accessory 108 (Accessory B). The first mobile device 102 includes configuration files 110, which may include an Accessory A configuration file 112 and an Accessory B configuration file 114. Similarly, the second mobile device 104 includes configuration files 120 including an Accessory A configuration file 122 and an Accessory B configuration file 124. While two mobile devices and two accessories are shown in FIG. 1 for ease of understanding, additional or fewer mobile devices and/or additional or fewer accessories may be used in accordance with the principles of the present disclosure.

The configuration files 110 of the first mobile device 102, which may comprise binary files, store configuration preferences that the user, operator or other entity may have established regarding how an accessory is to operate when that accessory is paired with the first mobile device 102. For example, the Accessory A configuration file 112 specifies the user's preference for the operation of the first accessory 106 when the first accessory 106 is paired with the first mobile device 102. By contrast, the Accessory B configuration file 114 specifies the preference for the operation of the second accessory 108 when the second accessory 108 is paired with the first mobile device 102.

Similarly, the configuration files 120 of the second mobile device 104 store configuration preferences that the user, operator or other entity may have established regarding how an accessory is to operate when that accessory is paired with the second mobile device 104. For example, the Accessory A configuration file 122 specifies a preference (such as a user preference) for the operation of the first accessory 106 when the first accessory 106 is paired with the second mobile device 104. By contrast, the Accessory B configuration file 124 specifies a preference (such as a user preference) for the operation of the second accessory 108 when the second accessory 108 is paired with the second mobile device 120.

As described below, the configuration files 110, 120 may be transferred to the first Accessory A 106 and the second Accessory B 108 when the first mobile device 102 or the second mobile device 104 is proximate the Accessory A 106 or the Accessory B 108. In one example, the first mobile device 102 may be brought into proximity with Accessory A 106 and the mobile device 102 may read an NFC tag of Accessory A 106 to obtain pairing information useful to first mobile device 102. While the first mobile device 102 is proximate Accessory A 106, the first mobile device 102 may transfer the configuration file 112 to Accessory A 106 using, for example, a communication frequency identical to that utilized in conjunction with NFC (e.g., 13.56 MHz), but using a protocol that may not be recognized by NFC components. The configuration files 110, 120 on the mobile devices 102, 104 may each be stored with an indication of the respective accessory to which they pertain (e.g., a MAC address of the accessory). Similarly, the configuration files on the accessories 106, 108 may each be stored with an indication of the respective mobile device to which they pertain (e.g., a MAC address of the mobile devices).

In this matter, preferences for operations of accessories may be transferred to those accessories so that when pairing between mobile devices and accessories occurs, the accessory uses the preferences previously provided from the mobile device with which it is paired.

In one example, if the first accessory 106 comprises a visor mount Bluetooth speakerphone that is shared between a husband and a wife, the husband and wife may have different preferences for the visor mount Bluetooth speakerphone. For example, the husband may configure the visor mount Bluetooth speakerphone to stream audio from his mobile device to the visor mount Bluetooth speakerphone when the mobile device is tapped (or in proximity) to the accessory a single time. The husband may further configure that when the mobile device is tapped (or in proximity) to the accessory a second time the streaming audio through the visor mount Bluetooth speakerphone is interrupted. Conversely, the wife may configure the visor mount Bluetooth speakerphone to increase or decrease the volume setting of the visor mount Bluetooth speakerphone each time the mobile device is tapped (or in proximity) to the accessory. As described herein, these preferences may be set individually by the husband and wife and such preferences may be stored in configuration files that are provided to the visor mount Bluetooth speakerphone. Thus, when the husband's mobile device is interacting with the visor mount Bluetooth speakerphone, it operates in the manner configured for his preferences; whereas, when the wife's mobile device is interacting with the visor mount Bluetooth speakerphone, it operates in a manner configured for her preferences. While this example pertains to Bluetooth speakerphones, the teachings herein are not limited only to speakerphone accessories. To the contrary, the teachings herein pertain to any accessory including, but not limited to Bluetooth headsets, Bluetooth speakerphones, tablet computers, radios, media players, e-book readers, Internet browsing devices, etc., or any other devices that may be associated with mobile devices.

The configuration files 110, 120 may include any number of events having associated actions that the accessories 106, 108 take when the events occur. The configuration files 110, 120 may also include identifying information such as, for example, a mobile device MAC address, which may be used by the accessories 106, 108 to determine which of the configuration files 110, 120 should be utilized.

As shown in FIG. 1, the first accessory 106 stores configuration files 130 including a configuration file from the first mobile device 102 (reference numeral 132) and a configuration file from the second mobile device 104 (reference numeral 134). Similarly, the second accessory 108 stores configuration files 140 including a configuration file from the first mobile device 102 (reference numeral 142) and a configuration file from the second mobile device 104 (reference numeral 144). Additionally, the second accessory 108 stores a configuration file in association with second mobile device 104 (reference numeral 134).

As described herein, a mobile device may perform a method including obtaining first information from a close-proximity communication technology device associated with an accessory using a first communication technique using a communication frequency; using the information to establish a communication link with the accessory using a second communication technique; and transmitting second information to the accessory using a third communication technique different from the first communication technique and using the communication frequency.

The close-proximity communication technology device may comprise a near-field communication tag, such as a passive near-field communication tag. The accessory may comprise a mobile device accessory including Bluetooth communication functionality and/or Wi-Fi.

The first communication technique may comprise a near-field communication (NFC) protocol and the second communication technique may comprise a Bluetooth communication protocol and/or a Wi-Fi communication protocol.

Transmitting information may include transmitting configuration information associated with the accessory, wherein the configuration information comprises information that controls how the accessory will operate in response to proximity events from a mobile device. In one example, the transmitting comprises modulating a carrier wave at the communication frequency to facilitate communication with the close-proximity communication technology device.

As described herein, one method may be performed by an accessory and may include receiving a query from a mobile device using a close-proximity communication technology device using a first communication technique and using a communication frequency, establishing a communication link with the mobile device using a second communication technique, receiving information from the mobile device using a third communication technique different from the first communication technique and using the communication frequency. In one example, the second communication technique may be a Bluetooth connection and/or a Wi-Fi connection. In such an arrangement, the close-proximity communication technology device comprises a near-field communication (NFC) tag. The method may also include receiving information from the mobile device using the third communication technique comprises use of the near-field communication tag. The information received using the third communication technique is formatted differently than information received using the first communication technique. In some examples, NFC tag is capable of decoding communication using the first communication technique, but is incapable of decoding communication using the third communication technique. Receiving information may include receiving configuration information. Receiving information from the mobile device may include demodulating a carrier wave at the communication frequency to facilitate communication with the mobile device.

As described herein, an apparatus may include a near-field communication (NFC) module including an NFC passive tag and a connection capable of outputting a signal representative of a field detection (e.g., the detection of a signal having a frequency of 13.56 MHz field) at an NFC frequency, a memory for storing configuration information associated with operation of the apparatus, a Bluetooth communication module coupled to the NFC module and the memory, wherein the Bluetooth communication module is configured to receive Bluetooth pairing information from the NFC module and is further configured to detect information encoded in the field at the NFC frequency.

As described herein, another example method includes establishing a first close-proximity communication connection via a first protocol by providing connection information via a second close-proximity communication connection via a second protocol, obtaining configuration information via the second close-proximity communication connection, and configuring a response of the first close-proximity communication connection to an event associated with the second close-proximity communication connection.

As described herein, another example accessory for a mobile device includes a first close-proximity communications module comprising a processor, a second close-proximity communications module, and a memory. The example memory stores instructions which, when executed by the processor, cause the processor to establish a first close-proximity communication connection via a first protocol by obtaining connection information via the second close-proximity communications module and a second close-proximity communication connection, obtain configuration information via the second close-proximity communications module and the second close-proximity communication connection, and configure a response of the first close-proximity communication connection to an event associated with the second close-proximity communication connection.

For the sake of clarity, the following descriptions are provided with reference to the mobile device 102 and the accessory 106 of FIG. 1. However, reference to the mobile device 102 and the accessory 106 are merely for the purposes of explanation and should not be considered to be limiting or exclusive to the other devices shown in FIG. 1.

While the descriptions of the systems and methods herein are given using the example of near-field communication (NFC), the disclosure is not limited to NFC. To the contrary, the systems and methods described herein may utilize any close-proximity communication techniques including, but not limited to NFC, radio frequency identification (RFID) or any other suitable technology.

Figure 2:
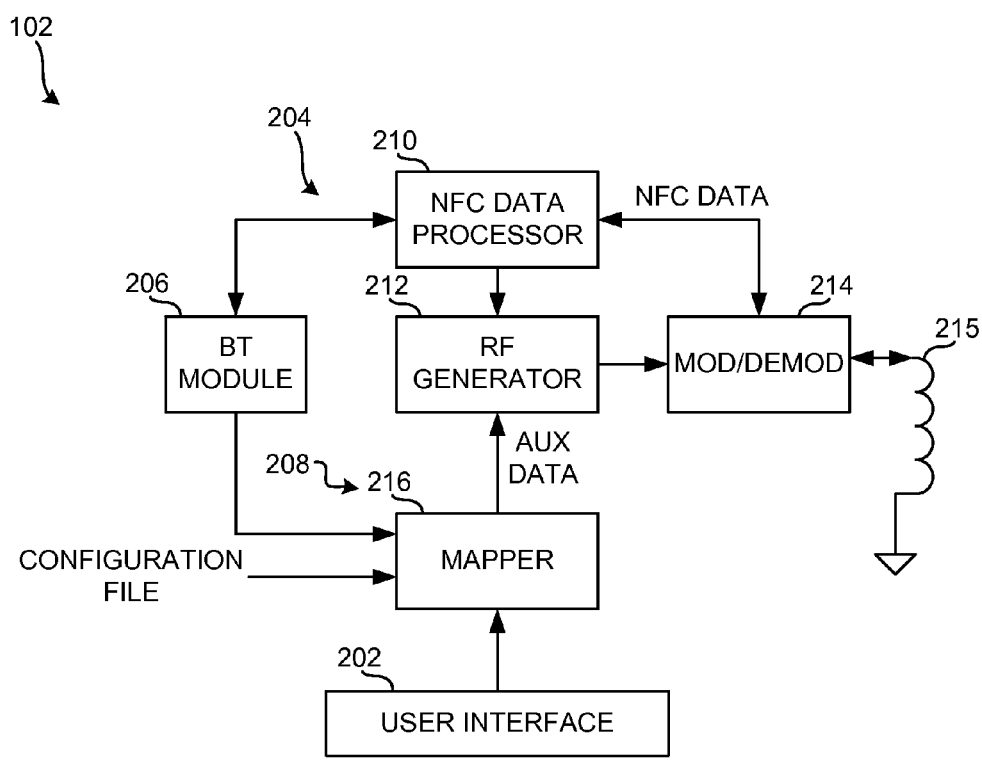
FIG. 2 is a block diagram of an example mobile device including near field communication (NFC) functionality and auxiliary data functionality, which may be used to transfer configuration information to accessories.

FIG. 2 depicts a block diagram of an example mobile device 102 implemented as described herein to support communication with near field communication-enabled devices, also referred to as NFC-enabled accessories. The mobile device 102 may include, for example, a mobile communication device, such as a smartphone, a mobile telephone, a portable computer, an internet browsing device, a media player, an e-book reader, a tablet computer or tablet-based computing device, or any other suitable device. Other functionality may be included in the mobile device 102 than is shown in FIG. 2 for purposes of clarity. The mobile device of FIG. 1 is shown as including a user interface 202, NFC circuitry 204, a Bluetooth module 206, and auxiliary data circuitry 208, which may be used to transfer configuration information to an accessory, such as the accessory 106 of FIG. 1. While described herein as circuitry, the NFC circuitry 204 and the auxiliary data circuitry 208 may be implemented using any suitable combination of hardware, circuits, or software.

As described in detail below, the mobile device 102 may use the NFC circuitry 204 to exchange NFC information regarding NFC-enabled accessory devices, which may include, for example, information related to Bluetooth technology (e.g., a BT NDEF structure). In addition to exchanging NFC information with the NFC-enabled accessory, the mobile device 102 may utilize the auxiliary data circuitry 208 to communicate configuration information to NFC-enabled accessory devices using, for example, a signal at the NFC frequency (e.g., 13.56 MHz), such as a powering or interrogation signal. The configuration information may be used to configure operation of the accessory 106 on a per-user basis. That is, as described above, an accessory may store a configuration or configuration file for each user of the accessory. In this manner, when a user pairs his or her mobile device 102 with the accessory 106, the accessory 106 will behave in a manner that was previously defined, for example, by the user. The configuration information may be used as a substitute, for example, for a user having to actuate buttons on the accessory 106. For example, the configuration information may be used to define setting changes of the accessory 106 in response to events (e.g., an NFC event, such as a tap, etc.). For example, a tap may re-route the audio path to an FM transmitter, or may increase the volume of a speaker.

In the example of FIG. 2, the user interface 202 enables the mobile device 102 to receive information provided by a user and may be used to present information to the user. For example, the user interface 202 may include a keypad, a display, a touch screen or touch-sensitive device, or any other devices to provide information to and present information from the mobile device 102.

In the example of FIG. 2, the NFC circuitry 204 includes an NFC data processor 210 that selectively enables an RF generator 212. The NFC circuitry 204 may also include other circuits, hardware, and systems not shown in FIG. 2. The RF generator 212 produces a carrier signal, such as a 13.56 megahertz (MHz) signal that is coupled to a modulator/demodulator 214, which is further coupled to an antenna 215. The modulator/demodulator 214 also receives an input of NFC communication information, such as read requests, write requests, lock requests, or any combination thereof from the NFC data processor 210. The mobile device 102 uses the NFC reader 204 to emit sufficient RF power (from, for example, the RF generator 212) to power up a passive NFC tag. The modulator/demodulator 214 modulates the signal from the RF generator 212 in accordance with the NFC communication information to communicate the commands using, for example, an ISO 14443 protocol. In response to these commands an NFC tag will take action.

The Bluetooth module 206 facilitates communication using the Bluetooth communication frequencies and protocol with other Bluetooth-enabled devices.

The auxiliary data circuitry 208 is provided by a mapper 216, which receives input such as a configuration file, commands, information from the user interface 202, information from the Bluetooth module 206, or any other suitable information. Such information may include the configuration information described above that configures operation of the accessory 106 in response to predefined events. Based on this information, the mapper 216 generates auxiliary data that is used to enable and disable the RF generator 212. For example, based on a configuration file, user input and/or a state of the Bluetooth module 206 and/or other information related to the state of the mobile device 102, the mapper 216 produces one or a series of pulses with specific durations and/or timing and provides these pulses to the RF generator 212 to, for example, enable the RF generator 212 during the high portions of the pulses and disable the RF generator 212 during the low portions of the pulses. In one example, the pulses are sent using on/off keying to send the auxiliary information, whereas signals pertaining NFC information are sent using frequency shift keying. Thus, the two different types of data can be distinguished. In this manner, the information from the mapper 216 on/off keys the RF generator 212. Thus, the RF generator 212 outputs pulses of the 13.56 MHz carrier corresponding to the pulses from the mapper 216, but the 13.56 MHz pulses are not modulated by the modulator/demodulator 214. A pulse train may include a header, such as a predetermined series of pulses, to define that information following the header is a configuration file to be stored and utilized by the accessory 106. The accessory 106 detects the presence of the 13.56 MHz pulses and their timing and durations and takes actions based on the information that the pulses convey. Actions may include, but are not limited to, call handovers, FM uplink enabling, caller swaps, FM frequency hopping, storage and utilization of a configuration file, address book transfers, or any other suitable actions. The auxiliary data circuitry 208 may include other circuits, hardware, and systems not shown in FIG. 2.

Thus, the mobile device 102 can send multiple different types of information to the accessory 106: information intended for an NFC tag on the accessory 106 and information intended for another part of the accessory 106, such as a Bluetooth processor. This distinction can be characterized as follows: For commands issued to the NFC tag, the NFC reader 204 generates a modulated carrier wave that falls under the applicable specification, e.g., ISO/IEC 14443 to facilitate communication with the NFC tag. In this case, the accessory 106 examines the duration of the carrier and discards the contents of the NFC read/write frame. For commands issued by the auxiliary data circuitry 208, information is sent from the mobile device 102 that is not readable or interpreted by the NFC tag but encodes the auxiliary information, such as a configuration file. However, based on the transmit durations of the auxiliary information, the auxiliary information can be interpreted by the accessory 106 as being auxiliary data, such as a configuration file. In some examples, the same modulation techniques falling within the provisions of the applicable specification (e.g., ISO/IEC 14443) may be used.

Figure 3:
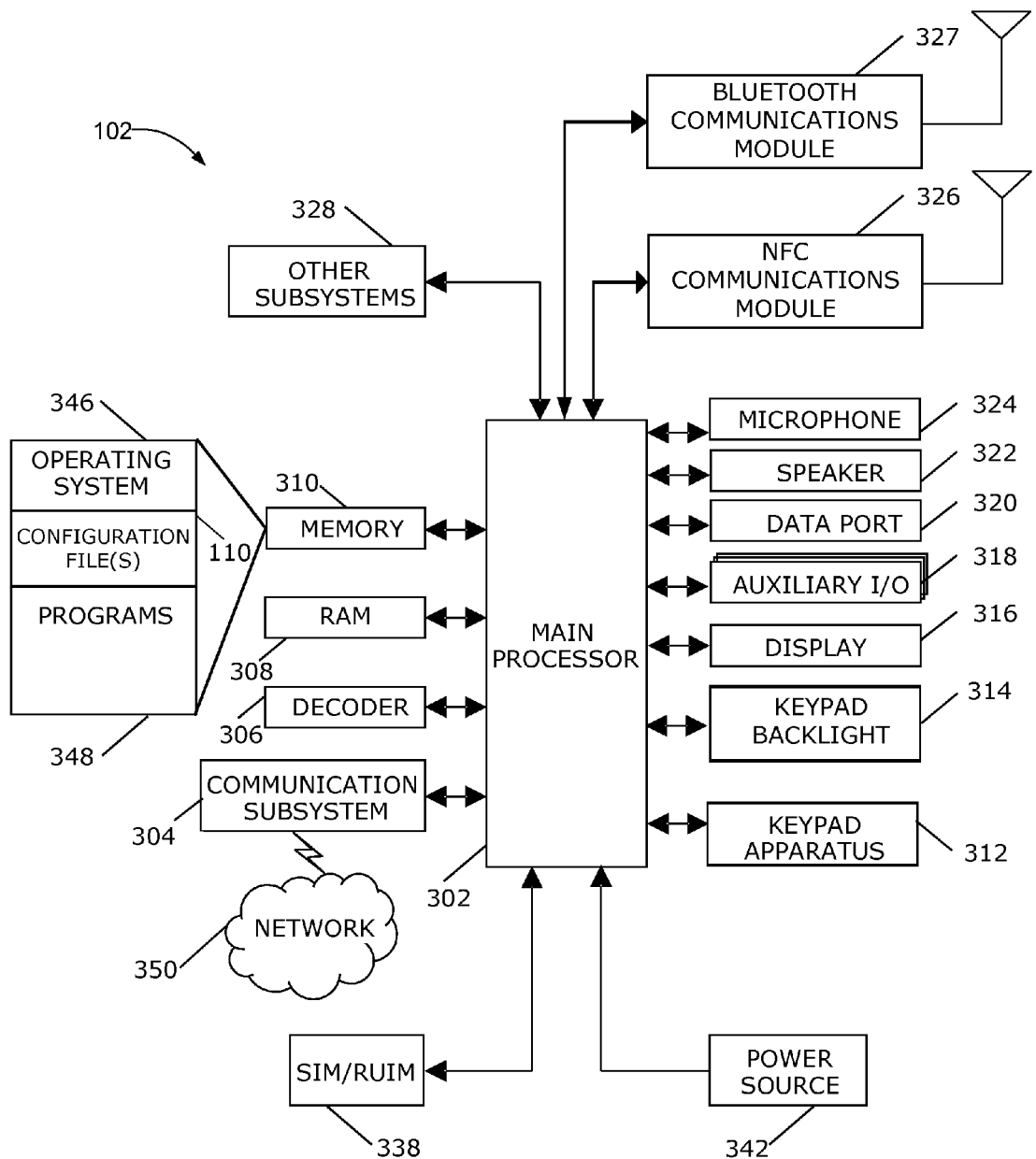
FIG. 3 is an alternative block diagram of the example mobile device of FIG. 2.

Further detail of certain aspects of the mobile device 102 of FIG. 1 is shown in FIG. 3. The mobile device 102 includes multiple components, such as a processor 302 that controls the overall operation of the mobile device 102. Communication functions, including data and voice communications, are performed through a communication subsystem 304. Data received by the mobile device 102 is decompressed and decrypted by a decoder 306. The communication subsystem 304 receives messages from and sends messages to a wireless network 350. The wireless network 350 may include any type of wireless network, including, but not limited to, data wireless networks, voice wireless networks, and networks that support both voice and data communications. A power source 342, such as one or more rechargeable batteries or a port to an external power supply, powers the mobile device 102.

The processor 302 interacts with other components, such as Random Access Memory (RAM) 308, memory 310, a keypad apparatus 312, a keypad backlight 314, a display 316, an auxiliary input/output (I/O) subsystem 318, a data port 320, a speaker 322, and a microphone 324. The processor 302 also interacts with an NFC communications module 326 and a Bluetooth communications module 327, as well as other subsystems 328.

In one example, the processor 302 and the memory 310 may cooperate to implement the functionality described herein. For example, tangible and/or non-transitory, and/or machine readable instructions may be stored by the processor 302 and/or the memory 310 to implement the functionality shown in FIG. 7.

Input via a graphical user interface is provided via the keypad apparatus 312 to the processor 302. Information, such as text, characters, symbols, images, icons, and other items that may be displayed or rendered on a mobile device, is displayed on the display 316, which may be a touch-sensitive display.

To identify a subscriber for network access, the mobile device 102 may utilize, for example, a Subscriber Identity Module or a Removable User Identity Module (SIM/RUIM) card 338 for communication with a network, such as the wireless network 350. Alternatively, identification information may be programmed into memory 310.

The mobile device 102 includes an operating system 346 and software programs, applications, or components 348 that are executed by the processor 302 and are typically stored in a persistent, updatable store such as the memory 310. Additional applications or programs may be loaded onto the mobile device 102 through the wireless network 350, the auxiliary I/O subsystem 318, the data port 320, the NFC communications module 326, the Bluetooth communications module 327, or any other suitable subsystem 328. Additionally, the memory 310 may store one or more configuration files 110. For example, the mobile device 102 may store an accessory configuration file for each accessory with which the mobile device 102 has been paired or otherwise associated.

A received signal such as a text message, an e-mail message, or web page download is processed by the communication subsystem 304 and input to the processor 302. The processor 302 processes the received signal for output to the display 316 and/or to the auxiliary I/O subsystem 318. A subscriber may generate data items, for example e-mail messages, which may be transmitted over the wireless network 350 through the communication subsystem 304. For voice communications, the overall operation of the mobile device 300 is similar. The speaker 322 outputs audible information converted from electrical signals, and the microphone 324 converts audible information into electrical signals for processing.

The configuration files 110 may be transferred to the accessory 106 using the NFC communications module 326, which includes the functionality described in conjunction with FIG. 2 to process and send auxiliary data. Alternatively, the configuration files 110 may be transferred to the accessory 106 using any other suitable means of exchange. As described herein, the use of the configuration files 110 by the accessory 106 can enable the accessory to be customized, for example by a user, such that when the user interacts with the accessory 106 using the mobile device 102, the accessory 106 behaves in a predefined manner. For example, the accessory 106 may respond to different inputs, such as NFC signals or taps (e.g., proximity events), in a predefined manner. Because each mobile device may transfer a different configuration file to a particular accessory, the accessory may be customizable for multiple different users and/or devices. Accordingly, the accessory 106 may respond differently in response to the same events when the accessory 106 is associated with different mobile devices.

Figure 4:
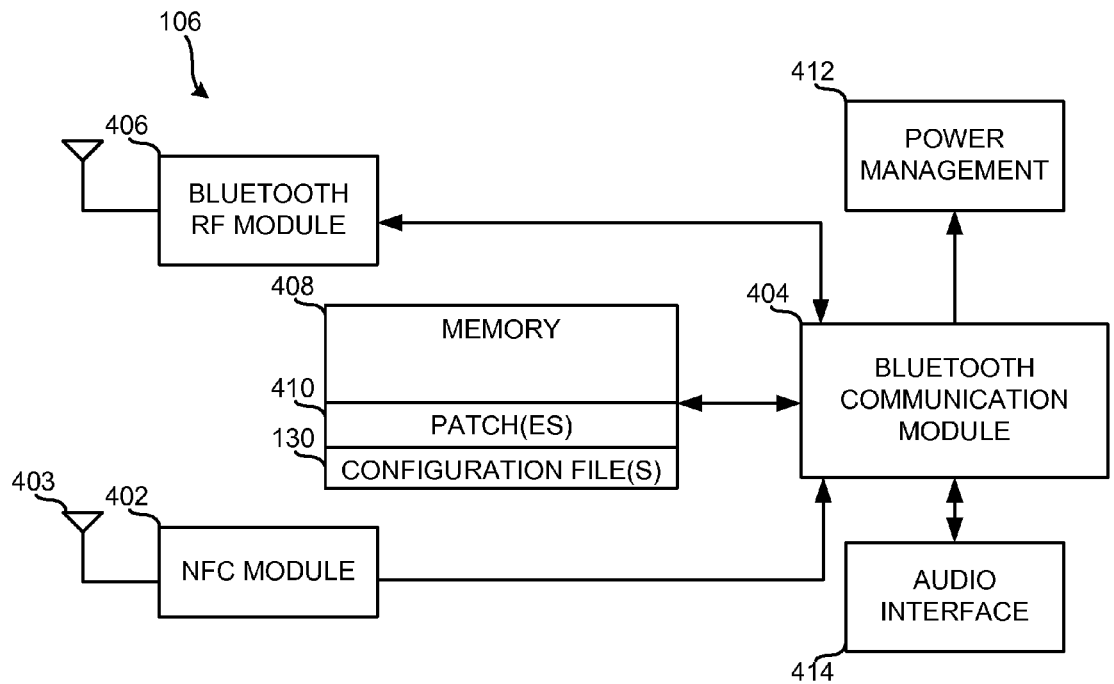
FIG. 4 is a block diagram of an example accessory that may receive configuration information from a mobile device.

As shown in FIG. 4, the accessory 106 may include an NFC module 402, and an associated antenna 403, coupled to a Bluetooth communication module 404, which is also coupled to a Bluetooth RF module 406. Additionally, the Bluetooth communication module 404 is coupled to a memory 408 that stores one or more patches 410 and configuration files 130, which have been transferred to the accessory 106 from the mobile device 102. The Bluetooth communication module 404 is also coupled to a power management block 412 and an audio interface 414.

Figure 5:
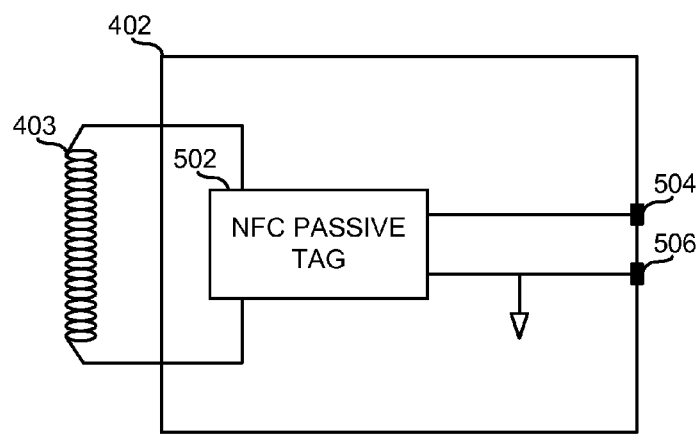
FIG. 5 is a block diagram of the NFC module of FIG. 4.
Figure 6:
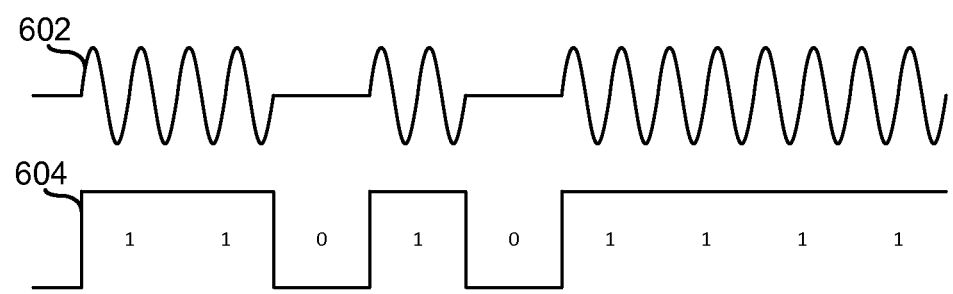
FIG. 6 is a signal plot showing RF signals and data to which the signals correspond according to one example.

The NFC module 402 may be coupled to a reset (or non-maskable interrupt) and a general purpose input/output (GPIO) port of the Bluetooth communication module 404. As shown in detail in FIG. 5, the NFC module 402 may include a NFC passive tag 502 including a field detect pin, a contact, or a connection 504 and a ground pin or connection 506. In one example, the NFC module 402 may be implemented using a device from NXP bearing model number MFOU180NDTP. The field detect pin 504 of the NFC module 402 changes state between a logical 0 and a logical 1 based on the presence or absence of a 13.56 MHz field, which is the frequency used by NFC systems. Thus, for example, during exchange of NFC information the field detect pin 504 may output a logical 1 because a 13.56 MHz field is present. With reference to FIG. 6, a 13.56 MHz signal 602 may be on-off keyed at the mobile device 102 in accordance with the information in the configuration file to transfer the binary configuration file to the accessory 106. FIG. 6 shows an output of the field detect pin 504 (reference numeral 604) corresponding to the on-off keyed signal 602. In accordance with the example of FIG. 6, the presence of a 13.56 MHz signal corresponds to a logical 1, whereas absence of a 13.56 MHz signal corresponds to a logical 0. In another embodiment, a logical 0 could correspond to presence of a 13.56 MHz signal and a logical one could correspond to absence of a 13.56 MHz signal. The sense of the signal of the field detect pin 504 may depend on the output configuration of the NFC module 402. For example, an open-collector output at the NFC module 402 may result in a logical 1 in the absence of a 13.56 MHz signal at the input to the NFC module 402.

Accordingly, the signal from the field detect pin 504 may be used to reset or interrupt the Bluetooth communication module 404 in the event that the Bluetooth communication module 404 is in a low-power mode. Additionally, using the field detect pin 504, configuration information that is modulated onto a 13.56 MHz signal using an on off keying modulation scheme, wherein the presence and absence of the 13.56 MHz signal changes the state of the field detect pin 504, may be detected. Thus, the NFC passive tag 502 provides a demodulated pulse train on the field detect pin 504 that provides information from the mobile device 102. Thus, receiving information from the mobile device comprises demodulating a carrier wave at the communication frequency to facilitate communication with the mobile device.

After being reset or interrupted, the Bluetooth communication module 404 may monitor the output of the field detect pin 504 for a predefined header signifying that information following the predefined header is configuration information (e.g., a configuration file) from the mobile device 102 that is to be stored and utilized by the accessory 106. In this matter, the configuration files 130 and the patches 410 may be transferred to the Bluetooth communication module 404, which may transfer the configuration files 130 and the patches 410 to the memory 408 using, for example, an inter-integrated circuit ($I^2C$) interface.

As described herein, the patches 410 and the configuration files 130 are used to alter the operation of the Bluetooth communication module 404 in a manner that customizes operation of the accessory 106 on a per-user basis. For example, when the Bluetooth communication module 404 detects that it is paired with or associated with the mobile device 102, the Bluetooth communication module 404 implements the configuration file 132 (FIG. 1) to customize operation of the Bluetooth communication module 404 in accordance with preferences of the user of the mobile device 102. The patches 410 are used to augment the functionality of the Bluetooth communication module 404 and allow the Bluetooth communication module 404 to process the configuration files 130. As described above, the configuration files allow the Bluetooth communication module 404, and, in turn, the accessory 106, to operate according to preferences.

Block diagrams of apparatus and flowcharts representative of example processes that may be executed to implement some or all of the elements and devices described herein are described below and shown in the drawings. In these examples, the process represented by each flowchart may be implemented by one or more programs comprising machine readable instructions for execution by: (a) a processor, such as the processor 302, (b) a processor or module, such as the Bluetooth communication module 404, and/or (c) any other suitable device.

The one or more programs may be embodied in software or software instructions stored on a tangible medium such as, for example, a flash memory, a CD-ROM, a hard drive, a DVD, or a memory associated with a processor, but the entire program or programs and/or portions thereof could alternatively be executed by a device other than a processor and/or embodied in firmware or dedicated hardware (e.g., implemented by an application specific integrated circuit (ASIC), a programmable logic device (PLD), a field programmable logic device (FPLD), discrete logic, etc.). For example, any one, some, or all of the example mobile communications system components could be implemented by any combination of software, hardware, and/or firmware. Also, some or all of the processes represented by the flowcharts may be implemented manually.

As used herein, the term tangible computer readable medium is expressly defined to include any type of computer readable storage. Additionally or alternatively, the example processes described herein may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium.

Further, although the example processes are described with reference to flowcharts, many other techniques for implementing the example methods and apparatus described herein may alternatively be used. For example, with reference to the flowcharts, the order of execution of the blocks may be changed, and/or some of the blocks described may be changed, eliminated, combined, and/or subdivided into multiple blocks. Any of the described blocks may be implemented as part of an existing system. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may comprise any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 7:
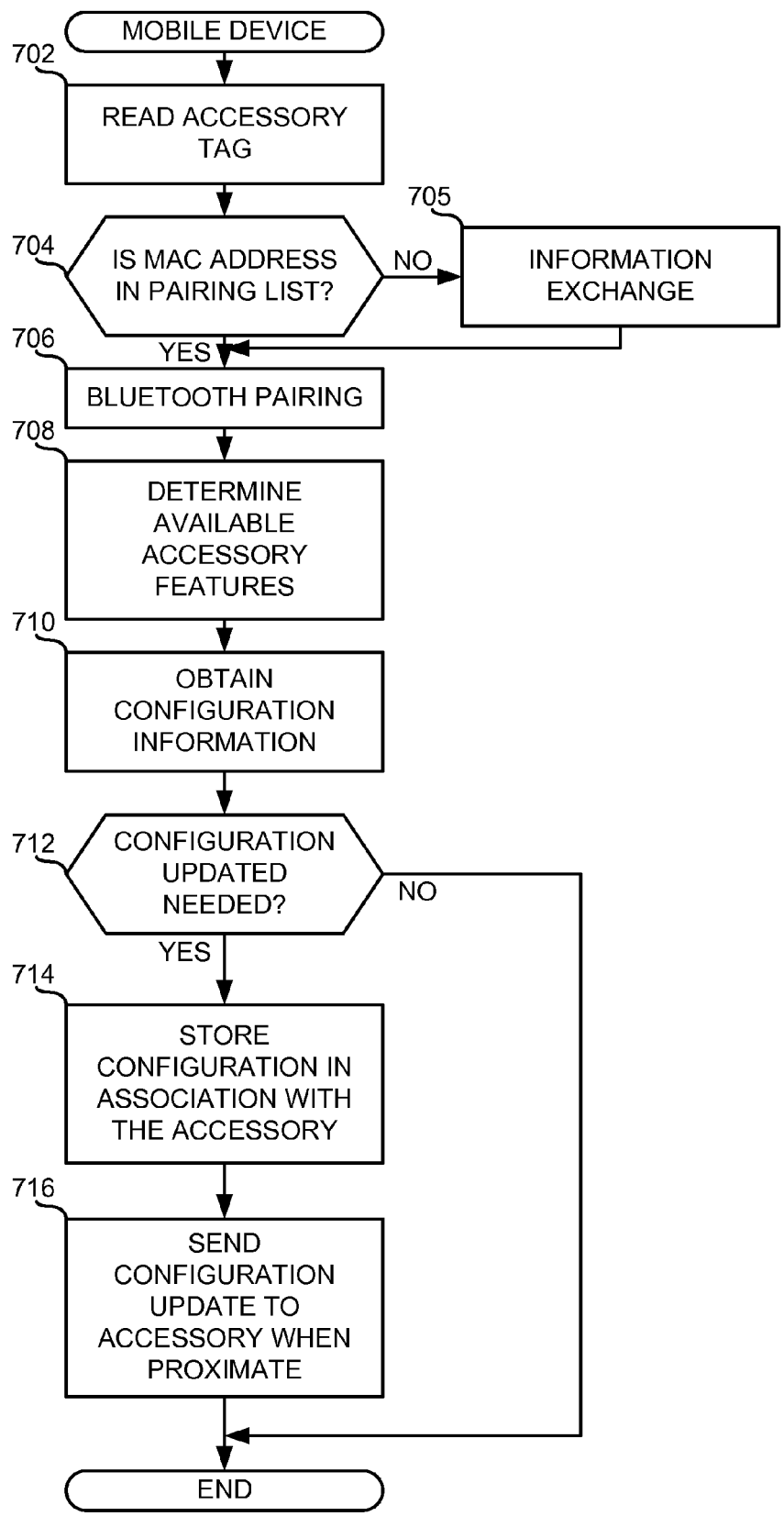
FIG. 7 is a flowchart of an example process that may be carried out at least partially by the mobile device of FIG. 1 to transfer configuration information to an accessory.
Figure 8:
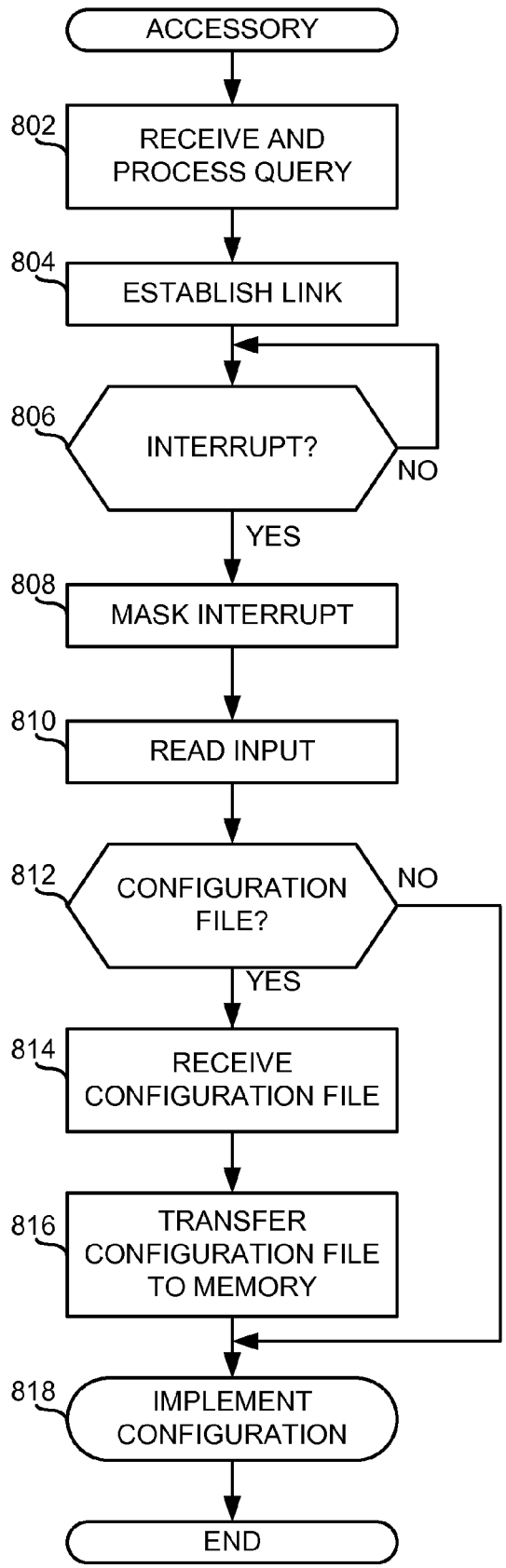
FIG. 8 is a flowchart of an example process that may be carried out at least partially by the accessory of FIG. 1 to receive configuration information.
Figure 9:
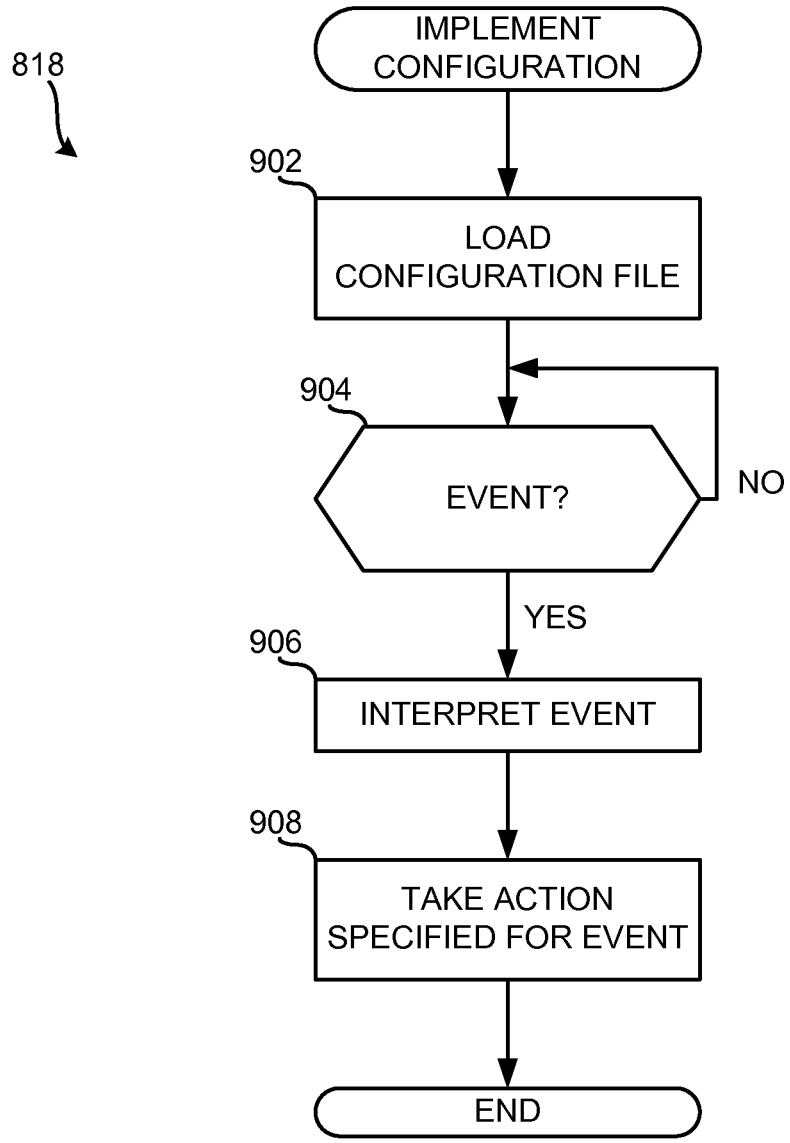
FIG. 9 is a flowchart of an example process that may be carried out at least partially by the accessory of FIG. 1 to implement a configuration.

The following descriptions of the processes in FIGS. 7-9 are made with reference to the mobile device 102 and the accessory 106 for purposes of explanation. However, the processes described in conjunction with FIGS. 7-9 may be utilized with any mobile device and any suitable accessory.

The mobile device 102 may carry out the process of FIG. 7 when the user is trying to configure an accessory that is currently paired with the mobile device 102 or when the mobile device 102 is in proximity to an accessory that is not currently paired with the mobile device 102 and the user wants to change the default configuration of that accessory to customize the operation of that accessory when that accessory interoperates with the mobile device 102. The mobile device 102 reads an accessory tag, such as a passive NFC tag that is associated with the accessory 106 (block 702). The accessory tag may provide accessory information such as a device type or class, a MAC address, configurable parameters, one or more uniform resource locators (URL), and any other suitable information associated with the accessory 106. Additionally, it is possible to securely set up a connection between the accessory 106 and the master mobile device 102. For example, additional security may be provided for setting up the connection by informing the accessory 106 of the exact MAC address of the mobile device 102 prior to the accessory going into discovery mode. In this manner, if two mobile devices 102, 104 try to connect to the same accessory 106, the one that tapped the accessory will be the only one that will be the master for the accessory 106.

Based on the information provided by the accessory tag, the mobile device 102 determines if the accessory 106 is in a pairing list for the mobile device 102 (block 704). This determination may be made based on the MAC address or any other suitable information provided by the accessory 106. Alternatively, if the accessory 106 does not have a MAC address found in the pairing list of the mobile device 102, the mobile device 102 exchanges information with the accessory 106 (block 705). In one example the information exchanged may be information that is used to facilitate Bluetooth pairing or any other connectivity between the mobile device 102 and the accessory 106. If the accessory bears a MAC address that is in the pairing list (block 704) or after information is exchanged (block 705), Bluetooth pairing is carried out (block 706). Accordingly, the information exchanged via NFC facilitates establishing the Bluetooth pairing between the mobile device 102 and accessory 106.

The mobile device 102 determines available accessory features (block 708) for the accessory 106. In one example available, features may be based on device class (e.g., the device an earpiece, a speaker phone, etc.). Alternatively, the available accessory features may be determined by accessing information stored within the mobile device 102 if the mobile device 102 is pre-programmed with a default accessory feature set for the accessory device class. As a further alternative, the available accessory features may be determined by accessing a database remote from the mobile device 102. For example, the mobile device 102 may access a URL provided by the accessory 106 and the URL may provide the listing of accessory features that may be customizable.

The mobile device 102 obtains configuration information (block 710), which may be provided through a user interface, or through any other suitable interface. For example, the configuration information may specify how the accessory will respond to different events, such as NFC taps, or any other events. In one example, address book transfers may be carried out using this communication configuration. If the configuration update as needed (block 712), the mobile device 102 stores the configuration in association with the accessory 106 (block 714). For example, the configuration may be stored in association with the MAC address of the accessory so that the configuration may be recalled at a later time, if necessary.

The mobile device 102 then sends the configuration update to the accessory 106 when the mobile device 102 is proximate the accessory 106 (block 716). As described herein, the configuration update may be sent to the accessory 106 using a frequency identical to or associated with NFC communications (e.g. 13.56 MHz), but using a modulation scheme different than that of NFC communications. Thus, the infrastructure associated with NFC communications may be reused to transfer configuration information from the mobile device 102 to the accessory 106 without significant additional hardware or software. If no configuration update is needed (block 712) or after the configuration update is sent (block 716), the process of FIG. 7 ends.

FIG. 8 shows a process that may be performed by the accessory 106, part of which may be carried out by the Bluetooth communication module 404 of the accessory 106. In other examples the process of FIG. 8 may be carried out by another portion or other portions of the accessory 106.

As shown in FIG. 8, the accessory 106 receives and processes a query, such as an NFC query for information, such as pairing information (block 802). The query may be made using a first communication technique using a communication frequency. The accessory 106 then establishes a link, such as a Bluetooth link, with the mobile device 102 based on the pairing information (block 804). The link may be carried out using a second communication technique, such as Bluetooth. The accessory 106 waits for an interrupt (block 806). After an interrupt is received, the accessory 106 masks the interrupt (block 808) and reads the input from the NFC module 402 (block 810). Reading the input (block 810) may include reading a general purpose input/output port of the Bluetooth communication module 404 or any other suitable input port to obtain the output of the field detect pin 504 of the NFC module 402.

The accessory 106 determines whether the information read at the input is indicative of the fact that a configuration file is being passed from the mobile device 102 to the accessory 106 (block 812). For example, the accessory 106 may look for a predefined series of bits that form a header of a configuration file. If the configuration file is being received (block 812), the accessory 106 receives the configuration file (block 814) and transfers the configuration file to memory (block 816). Receipt of the configuration file may be carried out using a third communication technique that utilizes the communication frequency utilized by the first communication technique.

In one example, the Bluetooth communication module 404 may receive the configuration file and store the same in a local memory before transferring the configuration file to the memory 408 using, for example, an I²C communication protocol, serial peripheral interface (SPI), Singlewire protocol, or any other suitable communication protocol. The configuration file may be stored in the memory 408 with an indication that the configuration file is associated with the mobile device 102, which is the device that sent the configuration file. In one example, the association may be made through the MAC address of the mobile device 102. Accordingly, as described below, in future instances in which the mobile device 102 is paired with the accessory 106, the accessory 106 will access the configuration file that is associated with the mobile device 102 so that the accessory 106 behaves as previously defined by the user of the mobile device 102.

After the configuration file has been transferred to memory (block 816) or if the information provided by the field detect pin 504 of the NFC module 402 does not indicate that a configuration file is to be received, the accessory 106 implements the configuration (block 818). Further detail regarding implementing the configuration is shown in FIG. 9. The process of FIG. 9 may be implemented by the Bluetooth communication module 404 of the accessory 106 to configure the behavior of the accessory 106 in accordance with the preferences of the user of the mobile device 102. The process of FIG. 9 loads the configuration file (block 902) and waits for an event having an entry in the configuration file to occur (block 904). When an event defined in the configuration file occurs (block 904), the accessory 106 interprets the event (block 906) and takes an action specified in the configuration file (block 908). For example, if the event is an NFC tap event, the accessory 106 may access the configuration file to determine that upon occurrence of an NFC tap event the volume of the accessory is to be increased. Of course, an NFC tap event is only one such event that may be contemplated in the configuration file and volume adjustment is only one action may be taken in response to such an event.

Figure 10:
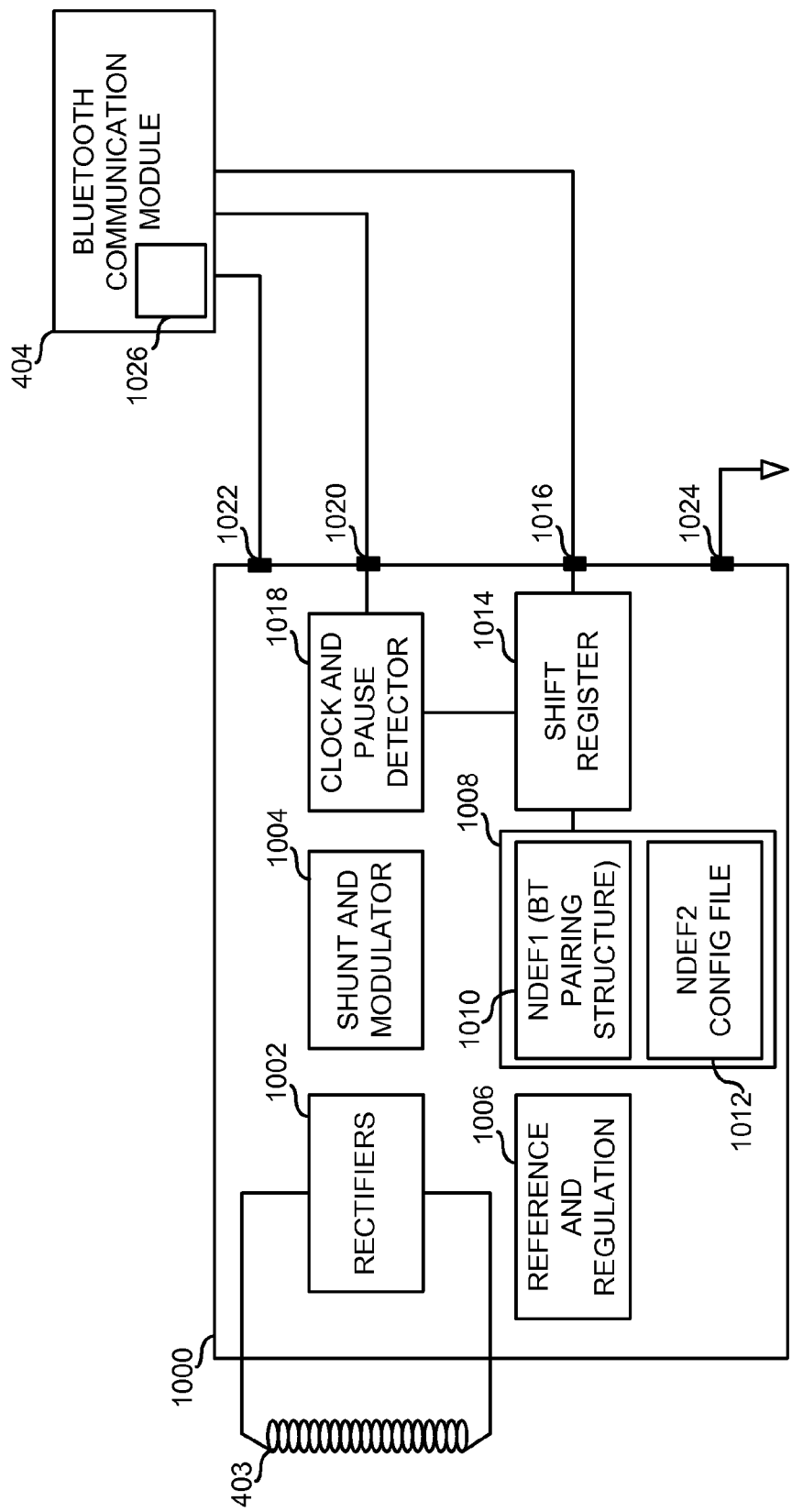
FIG. 10 is a block diagram of an example NFC module that may be used to implement the NFC module of FIG. 3.

FIG. 10 is a block diagram of an alternative NFC module 1000 that may be used to implement the NFC module 402 of FIG. 4. The example NFC module 1000 of FIG. 10 may be used to provide multiple NDEF files for a Bluetooth module (e.g., the Bluetooth communication module 404 of FIG. 4) via an NFC connection. In some examples, the multiple NDEF files may include a first NDEF file to enable Bluetooth pairing with a device and a second NDEF file to provide configuration information (e.g., preference information) from the same device. The configuration information may be processed by the Bluetooth communication module 404 to determine how the Bluetooth communication module 404 is to handle future events (e.g., NFC tap events) from the device.

The example NFC module 1000 of FIG. 10 includes the antenna 403 of FIG. 4, which is coupled to a rectifier 1002 and a shunt/modulator block 1004. The example NFC module 1000 of FIG. 10 further includes reference and/or regulator voltages 1006.

To store NDEF files received via the antenna 403, the example NFC module 1000 of FIG. 10 includes a memory or storage 1008. The example memory 1008 stores received NDEF files, such as a Bluetooth pairing NDEF file 1010 and/or a configuration NDEF file 1012. In the example of FIG. 10, the Bluetooth pairing NDEF file 1010 is received from another device to which the Bluetooth communication module 404 is to be paired. The configuration NDEF file 1012 may implement the example mobile device configuration files 132, 134 of FIG. 1.

The example NFC module 1000 of FIG. 10 further includes a shift register 1014 to transfer information to the Bluetooth communication module 404. The example shift register 1014 includes a serial input/output (I/O) terminal 1016 and is controlled via a clock and pause detector 1018. The example clock and pause detector 1018 receives clock signals via a clock input 1020 from the Bluetooth communication module 404. The example Bluetooth communication module 404 transmits signals to the clock and pause detector 1018 via the clock input 1020. When the clock and pause detector 1018 receives a clock input, the clock and pause detector 1018 causes the shift register 1014 to output a unit of data (e.g., one bit of the Bluetooth pairing NDEF file 1010, one bit of the configuration NDEF file 1012) via the serial I/O terminal 1016 to the Bluetooth communication module 404. In some examples, the Bluetooth communication module 404 controls the clock input 1020 to cause the shift register 1014 to output a block of data including multiple units, such as a byte, to the Bluetooth communication module 404 for processing.

The example Bluetooth communication module 404 processes the information transferred from the NFC module 1000 (e.g., to determine that the information is valid, to determine that the information complies with NDEF structure and formatting, etc.). If the information is correct, the Bluetooth communication module 404 controls the clock input 1020 to cause the NFC module 1000 to transfer another block of data. The example Bluetooth communication module 404 and the NFC module 1000 repeat this cycle until the Bluetooth module has received an entire NDEF file 1010, 1012. In the event that the NDEF file 1010, 1012 is incorrect, the example Bluetooth communication module 404 sends a signal or a message to the NFC module 1000 via the serial I/O terminal 1016 to indicate a data error.

Upon receipt of such a signal or message, the example NFC module 1000 notifies a device (e.g., a mobile device) of the failure. Such a failure may occur if, for example, a user removes the device from communication with the NFC module 1000 prior to a complete NDEF file 1010, 1012 being transferred. The notification may prompt the user to retry the NFC communication to achieve a successful pairing and configuration of the accessory 106 of which the NFC module 1000 and the Bluetooth communication module 404 are a part.

The Bluetooth communication module 404 may cause the example NFC module 1000 to obtain the configuration NDEF 1012 from a mobile device in response to determining that the Bluetooth pairing NDEF 1010 is correct and/or in response to pairing to the mobile device via Bluetooth using the Bluetooth pairing NDEF 1010. For example, the Bluetooth communication module 404 and/or the NFC module 1000 may signal to the example mobile device that the accessory 106 may be configured to respond to NFC events. When the NFC module 1000 receives the configuration NDEF file 1012, the example Bluetooth communication module 404 causes the NFC module 1000 to transmit the configuration NDEF file 1012 to the Bluetooth communication module 404 (e.g., via the clock input 1020, the clock and pause detector 1018, the shift register 1014, and the serial I/O terminal 1016).

The example Bluetooth communication module 404 receives the configuration NDEF file 1012 and processes the configuration NDEF file 1012. The Bluetooth communication module 404 may, for example, store a particular action to be taken in association with NFC events detected via a field detect pin 1022 (e.g., a pin or terminal that is asserted when the NFC module detects an NFC electromagnetic field such as a modulated 13.76 MHz signal) of the NFC module 1000 when the Bluetooth communication module 404 is paired to the mobile device from which the configuration NDEF file 1012 was received. Example actions (or responses) may include increasing an audio volume, decreasing an audio volume, resetting an audio volume to a particular volume level, muting an audio input, unmuting an audio input, skipping playback of an audio track, changing which of differently-colored LEDs is to be lit on the accessory, change a sampling rate of an audio input, unpairing the mobile device from the Bluetooth communication module, and/or performing any other action within the capabilities of the Bluetooth communication module 404. The example NFC module 1000 also includes a reference terminal 1024 to connect to a reference potential.

The example Bluetooth communication module 404 of FIG. 10 includes a processor 1026 to, among other things, process instructions and receive interrupts. The example processor 1026 of FIG. 10 receives interrupt signals from the NFC field detect pin 1022, which may cause the processor 1026 to invoke a response action (e.g., a configured action). The example processor 1026 further executes instructions to read data from the NFC module 1000, to process the data (e.g., validate the data, perform instructions based on the data, etc.), and/or to perform processes such as the processes described below with reference to FIGS. 11-12. In some other examples, the accessory 106 implement the processor 1026 separate from the Bluetooth communication module 404.

In some examples, the configuration NDEF file 1012 may cause the Bluetooth communication module 404 to be configured to perform different actions under different contexts. For example, a configuration may include a default action to decrease a volume of audio output and a special action to increase and/or reset the volume of audio output to a particular level when the volume of the audio output is at the lowest level. Depending on the action(s) programmed by the configuration NDEF file 1012, the example configuration NDEF file 1012 may be a type 2 NDEF file, a type 4 NDEF file, and/or any other type of NDEF file. The example Bluetooth communication module 404 may store the configuration in a storage device or memory and retrieve the configuration when a subsequent pairing with the mobile device occurs.

In some examples, pairing to the accessory 106 may be interruptable by another mobile device (e.g., the mobile device 104) that is not paired to the accessory 106. For example, an audio playback accessory device may be capable of playing back media delivered to the accessory device from a mobile device to which the accessory is paired via a Bluetooth or Wifi connection. While the example accessory 106 is paired to a first mobile device 102 and playing media from the mobile device 102, the accessory 106 may respond to NFC events by the first mobile device 102 according to a configured action. However, when a different mobile device 104 causes an NFC event, the example accessory 106 may identify that the NFC event corresponds to a non-paired device, unpair from the first mobile device 102, and establish a new pairing with the second mobile device 104. The example accessory 106 may then begin playing media delivered from the second mobile device 104.

The example accessory 106 may identify NFC events as belonging to a paired mobile device (e.g., the mobile device 102), to a different mobile device (e.g., the mobile device 104), and/or to an unknown mobile device (e.g., either of the mobile devices 102, 104 or another device). A mobile device may be unknown if, for example, information is not successfully transferred during the NFC event to identify the source of the NFC event. If the example accessory 106 identifies first mobile device 102 or an unknown mobile device during the NFC event, the example accessory 106 may perform a configured response. By contrast, if the example accessory 106 detects that the NFC event is caused by the second mobile device 104 (or another, identifiable mobile device that is not the mobile device 102), the example accessory 106 obtains pairing information (e.g., the pairing NDEF file 1010), unpairs from the mobile device 102, and pairs with the mobile device 104 that caused the NFC event.

Figure 11:
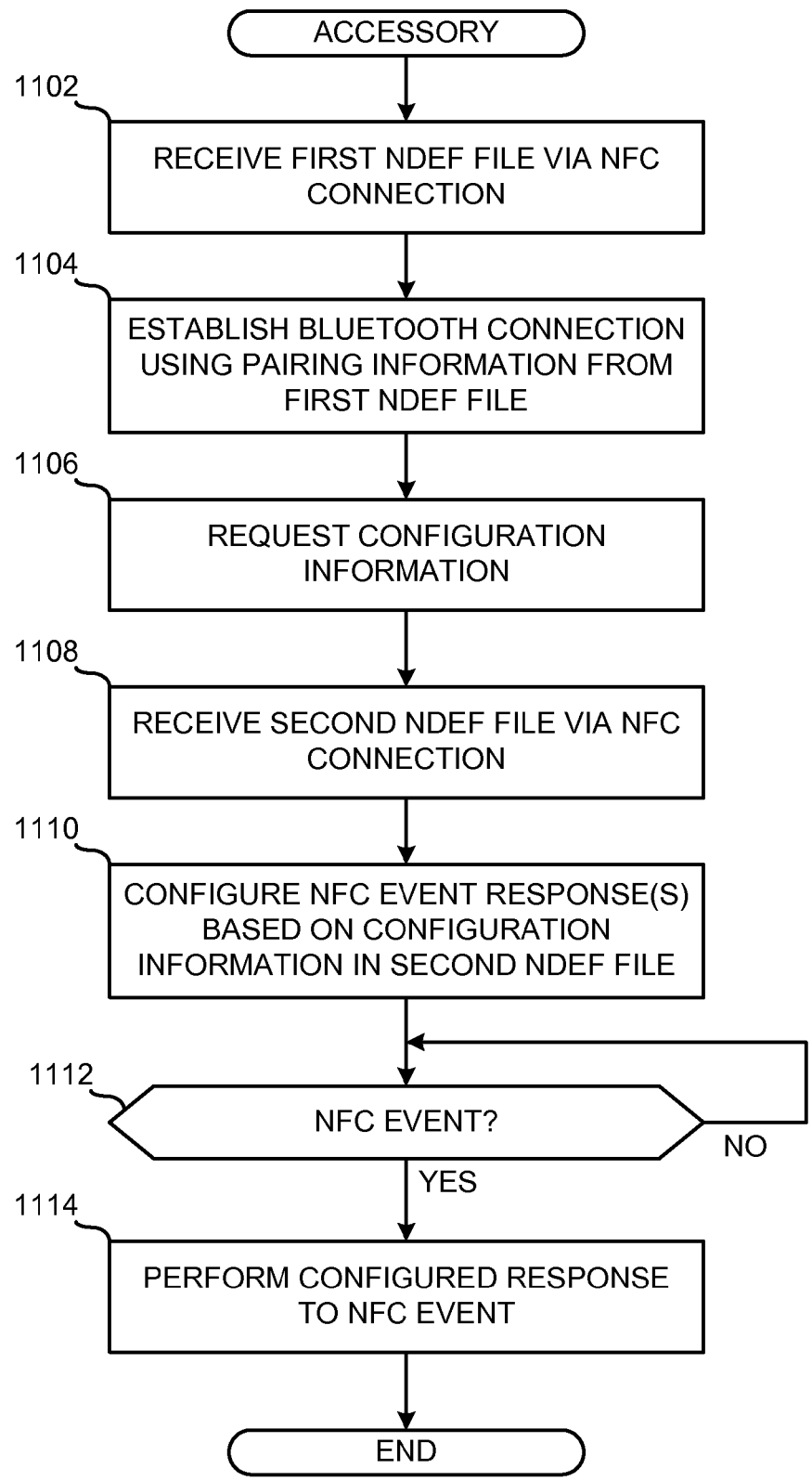
FIG. 11 is a flowchart of an example process that may be carried out by an accessory to a mobile device to obtain configuration information from a mobile device.

FIG. 11 shows a process that may be carried out by the accessory 106, part of which may be carried out by the Bluetooth communication module 404 and/or the NFC module 1000 of the accessory 106. The example process of FIG. 11 may be used by the example Bluetooth communication module 404 to obtain multiple NDEF files from an NFC module, such as the example NFC module 1000 of FIG. 10, to configure the Bluetooth communication module 404 to respond to close-proximity communication events (e.g., detections of NFC electromagnetic fields).

The example accessory 106 receives a first file (e.g., the pairing NDEF file 1010) via a first close-proximity communications connection (e.g., an NFC connection via the NFC module 1000) (block 1102). In some examples, the first NDEF file 1010 includes pairing information to establish a second close-proximity communications connection (e.g., via Bluetooth pairing). Using pairing information in the first file, the example Bluetooth communication module 404 establishes the second close-proximity communications connection (e.g., a Bluetooth connection) with the mobile device (e.g., the mobile device 102) from which the first file 1010 was received.

The example Bluetooth communication module 404 requests configuration information (block 1106). For example, the Bluetooth communication module 404 may request the information via the first or second close-proximity communications connections. The NFC module 1000 receives a second file including the configuration information (e.g., the configuration NDEF file 1012) via the first close-proximity communications connection (e.g., the NFC connection) (block 1108). Based on configuration information in the second file (e.g., the configuration NDEF file 1012), the example Bluetooth communication module 404 configures response(s) to NFC event(s) (e.g., a default response and zero or more special responses) (block 1110).

The example Bluetooth communication module 404 determines whether an NFC event has occurred (block 1112). For example, the Bluetooth communication module 404 may poll the NFC field detect pin 1022 and/or receive an interrupt to normal processes when the field detect pin 1022 is asserted by the NFC module 1000. The example block 1112 continues to loop while an NFC event does not occur. If an NFC event occurs (block 1112), the example Bluetooth communication module 404 performs a configured response to the NFC event (block 1114). For example, the Bluetooth communication module 404 may be configured to perform one or more of increasing an audio volume, decreasing an audio volume, resetting an audio volume to a particular volume level, muting an audio input, unmuting an audio input, skipping playback of an audio track, changing which of differently-colored LEDs is to be lit on the accessory, change a sampling rate of an audio input, unpairing the mobile device 102 from the Bluetooth communication module, and/or any other action within the capabilities of the Bluetooth communication module 404.

The example process of FIG. 11 may then end and/or may iterate blocks 1112 and/or 1114 to await additional NFC events and to perform configured response(s).

Figure 12:
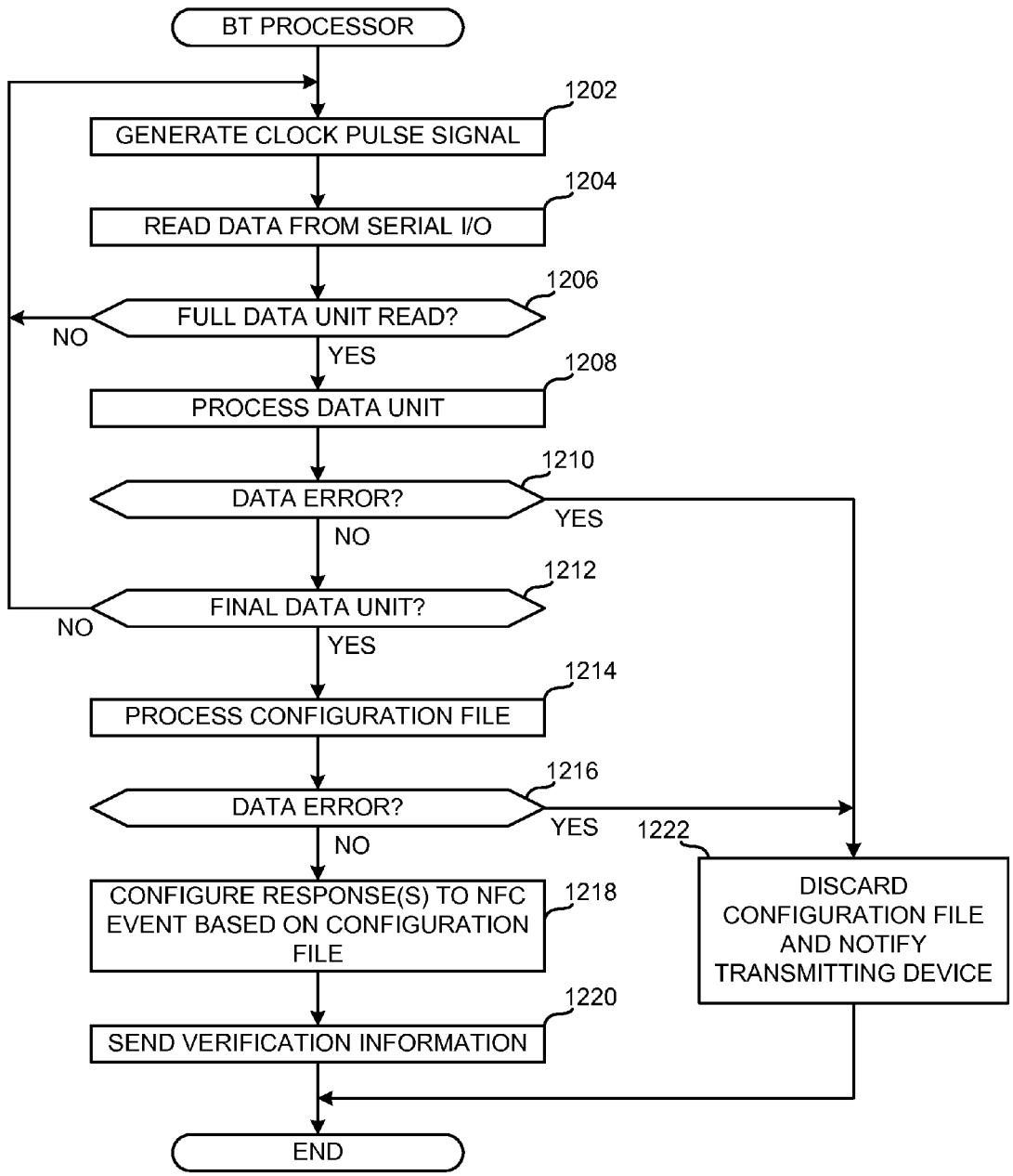
FIG. 12 is a flowchart of an example process that may be carried out by a Bluetooth communication module of an accessory to obtain multiple NDEF files from an NFC module.

FIG. 12 illustrates a process that may be performed by the example accessory 106, including the example Bluetooth communication module 404 and the example NFC module 1000 of FIG. 10 to communicate multiple NDEF files to the Bluetooth communication module 404 and to verify the files. The example Bluetooth communication module 404 may perform the example process of FIG. 12 when a file is to be transferred to the Bluetooth communication module 404 via the serial I/O terminal 1016 and the shift register 1014.

The example Bluetooth communication module 404 generates a clock pulse signal (e.g., to the clock input terminal 1020 of FIG. 10) (block 1202). The clock pulse signal causes the example NFC module 1000 to output data (e.g., a bit, a byte, or another unit of data) via the serial I/O terminal 1016, which is read by the Bluetooth communication module 404 (block 1204). The example Bluetooth communication module 404 determines whether a full data unit (e.g., a data unit that may be processed, a byte, a block of data, an entire NDEF file, or any other unit of data) has been read from the serial I/O terminal 1016 (block 1206). If a full data unit has not been read (block 1206), control returns to block 1202 to generate additional clock pulse signals.

When a full data unit has been read (block 1206), the example Bluetooth communication module 404 processes the data unit (block 1208). For example, the Bluetooth communication module 404 may determine whether the data unit complies with an expected structure and/or whether the data unit includes valid data. If there are no data errors (e.g., based on the processing) (block 1210), the example Bluetooth communication module 404 determines whether the final data unit has been received for the file (block 1212). If the final data unit has not been received (block 1212), control returns to block 1202 to generate additional clock pulses.

When the final data unit has been received (e.g., the Bluetooth communication module 404 has received a complete NDEF file) (block 1212), and a data error has not occurred during processing of the data units (block 1210), the example Bluetooth communication module 404 processes the configuration file (block 1214). For example, the Bluetooth communication module 404 may process the configuration NDEF file 1012 to determine that the configuration NDEF file 1012 is valid. If there are no data errors in the configuration NDEF file 1012 (block 1216), the example Bluetooth communication module 404 configures response(s) to NFC events based on the configuration NDEF file 1012 (block 1218). The example Bluetooth communication module 404 further sends verification information to the mobile device 102 associated with the configuration information (block 1220). Example verification information may include a hash of the configuration file, which may be used by the mobile device 102 to verify that the configuration file was transferred correctly. The example Bluetooth communication module 404 may send the verification information, for example, via the NFC module 1000 and/or via a Bluetooth communication connection to the mobile device 102.

If a data error occurs (block 1210 or block 1216), the example Bluetooth communication module 404 discards the configuration and notifies the transmitting mobile device 102 (block 1222). The example Bluetooth communication module 404 may send the notification via the NFC module 1000 and/or via a Bluetooth communication connection to the mobile device 102. In some examples, the Bluetooth communication module 404 may retain a previous configuration for the mobile device 102 in the event that an updated configuration file is not properly received or is invalid. The notification may serve to inform the user of the mobile device 102 that the configuration was not completed and to try the configuration again. By providing the notification, the example accessory 106 may avoid the perception by the user of a problem with the mobile device 102 and/or with the accessory 106.

After sending the verification information (block 1220) or sending the notification of a failed configuration (block 1222), the example process of FIG. 12 may end.

Accordingly, as described above preferences associated with an accessory may be specified by a user of a mobile device or another person or entity and those preferences may be transferred to the accessory in a file, such as a configuration file, that specifies an association between the events and actions to be taken by the accessory. Through the use of the configuration file, the accessory may be configured to operate as desired in an automated manner each time the mobile device is paired with the accessory. Additionally, multiple different configuration files may be stored within the accessory and the accessory may operate in accordance with the configuration file associated with the mobile device to which the accessory is currently paired. This association may be carried out through the use of MAC addresses in the configuration files, or in any other suitable manner. Verification of the configuration file and/or user notification of failed configuration processes may reduce user perception of faulty devices and/or accessories and may improve the user experience.

While the foregoing description has addressed the use of Bluetooth technology in conjunction with NFC technology and data transfer using the NFC frequency (e.g., 13.56 MHz), it should be noted that other technologies than Bluetooth may be utilized. For example, it is contemplated that Wi-Fi or any other suitable communication technology may be used in conjunction with the system described herein.

Although certain example methods, apparatus and articles of manufacture have been described herein, the scope of coverage of this disclosure is not limited thereto. On the contrary, this disclosure covers all methods, apparatus and articles of manufacture and equivalents described herein.

What is claimed is:

1. A method, comprising:
    establishing a first close-proximity communication connection with a first device via a first protocol by obtaining a first data file containing connection information via a near field communications connection with the first device via a second protocol;
    obtaining a second data file containing configuration information from the first device via the near field communications connection;
    based on the configuration information, configuring a response to subsequent events associated with the near field communications connection, wherein the subsequent events comprise detection of a near field communications electromagnetic field subsequent to the near field communications connection;
    detecting an event by monitoring a field detect pin of a near field communications module, wherein the near field communications module is associated with the near field communications connection; and
    performing the configured response in response to detecting the event, wherein the field detect pin is configured to change a state based on a presence or an absence of the near field communications electromagnetic field.

2. A method as defined in claim 1, wherein the subsequent events comprise detecting third close-proximity communications having a same type as the near field communications connection.

3. A method as defined in claim 1, wherein establishing the first close-proximity communication connection comprises receiving a first configuration file and establishing a pairing to a device from which the first configuration file was received.

4. A method as defined in claim 1, wherein the response is at least one of increasing an audio volume, decreasing the audio volume, resetting the audio volume to a volume level, muting an audio input, unmuting an audio input, skipping playback of an audio track, changing a colored of a display, changing a sampling rate of an audio input, or disconnecting the first close-proximity communication connection.

5. A method as defined in claim 1, wherein the configuration information comprises a type 2 near field communications tag.

6. A method as defined in claim 1, further comprising requesting the configuration information in response to establishing the first close-proximity communications connection.

7. A method as defined in claim 1, further comprising transmitting validation information to the first device.

8. A method as defined in claim 1, wherein performing the configured response comprises interpreting the event and taking an action specified in the configuration information based on the interpretation.

9. An accessory for a mobile device, comprising:
    a first close-proximity communications module comprising a processor;
    a near field communications module comprising a field detect pin; and
    a memory storing instructions which, when executed by the processor, cause the processor to at least:
        establish a first close-proximity communication connection with a first device via a first protocol by obtaining a first data file containing connection information via the near field communications module and a near field communication communications connection with the first device;
        obtain a second data file containing configuration information from the first device via the near field communications module and the near field communications communication connection;
        based on the configuration information, configure a response to subsequent events associated with the near field communications connection, wherein the subsequent events comprise detection of a near field communications electromagnetic field subsequent to the near field communications connection;
        detect an event by monitoring the field detect pin of the near field communications module; and perform the configured response in response to detecting the event, wherein the field detect pin is configured to change a state based on a presence or an absence of the near field communications electromagnetic field.

10. An accessory as defined in claim 9, wherein the instructions are to cause the processor to transmit validation information to a device from which the configuration information was received.

11. An accessory as defined in claim 9, wherein the first close-proximity communications module comprises a Bluetooth communication module.

12. A mobile device, comprising:
a first close-proximity communications module;
a near field communications module;
a processor; and
a memory comprising computer readable instructions which, when executed by the processor, cause the processor to:
  transmit first information via the near field communications module, the first information to enable an accessory to establish communications with the first close-proximity communications module;
  establish communications with the accessory via the first close-proximity communications module; and
  transmit second configuration information via the near field communications module, the second configuration information to cause the accessory to:
    configure a response to subsequent events that are associated with a near field communications module of the accessory and that occur after the accessory establishes the communications with the mobile device via the first close-proximity communications module, wherein the subsequent events comprise detection, by the accessory, of a near field communications electromagnetic field;
    detect an event by monitoring a field detect pin of the near field communications module of the accessory; and
    perform the configured response in response to detecting the event, wherein the field detect pin is configured to change a state based on a presence or an absence of a near field communications electromagnetic field.

13. A mobile device as defined in claim 12, further comprising a display, the instructions to further cause the processor to notify a user of a failure to configure the accessory.

14. A mobile device as defined in claim 12, wherein the instructions further cause the processor to generate the configuration information, the configuration information comprising a configuration file.

15. A mobile device as defined in claim 12, wherein the instructions further cause the processor to send the configuration information in response to a request for the configuration information from the accessory.

16. A method comprising:
establishing a first close-proximity communication connection with a first device via a first protocol by obtaining a first data file containing connection information via a first near field communications connection with the first device via a second protocol;
obtaining a second data file containing configuration information from the first device via the first near field communications connection;
based on the configuration information, configuring a first response to subsequent events associated with the first near field communications connection, wherein the subsequent events comprise detection of a near field communications electromagnetic field subsequent to the first near field communications connection;
establishing a second near field communications connection with a second device;
identifying a locally stored configuration file, stored prior to establishing the second near field communications connection, associated with the second device; and
configuring a second response to the subsequent events based on the stored configuration file.

17. A method as defined in claim 16, further comprising, in response to identifying the stored configuration file associated with the second device:
disconnecting the first close-proximity communication connection with the first device; and
establishing a second close-proximity communication connection with the second device based on the stored configuration file or a second stored configuration file.

18. A method as defined in claim 17, wherein disconnecting the first close-proximity communications connection is performed while the first close-proximity communications connection is active.

19. A method, comprising:
establishing a first close-proximity communication connection with a first device via a first protocol by obtaining a first data file containing connection information via a near field communications connection with the first device via a second protocol;
obtaining a second data file containing configuration information from the first device via the near field communications connection; and
based on the configuration information, configuring a response to subsequent events associated with the near field communications connection, wherein the subsequent events comprise detection of a near field communications electromagnetic field subsequent to the near field communications connection, wherein configuring the response to subsequent events comprises configuring a default response and at least one special response based on the configuration information.

* * * * *

UNITED STATES PATENT AND TRADEMARK OFFICE
CERTIFICATE OF CORRECTION

Page 1 of 1

PATENT NO. : 9,131,327 B2
APPLICATION NO. : 13/649787
DATED : September 8, 2015
INVENTOR(S) : Ahmed Abdelsamie et al.

It is certified that error appears in the above-identified patent and that said Letters Patent is hereby corrected as shown below:

In the Claims

Column 18, Line 54, In Claim 9, delete "communication communications" and insert
-- communications --, therefor.

Column 18, Lines 58-59, In Claim 9, delete "communications communication" and insert
-- communications --, therefor.

Signed and Sealed this
Ninth Day of February, 2016

Michelle K. Lee
*Director of the United States Patent and Trademark Office*